United States Patent [19]
Meller et al.

[11] Patent Number: 5,873,443
[45] Date of Patent: Feb. 23, 1999

[54] SHIFTABLE DEVICE ACTING AS A BRAKE OR CLUTCH, SUCH AS A FRICTIONAL BRAKE OR A FRICTIONAL CLUTCH

[75] Inventors: Udo Meller, Wermelskirchen; Dieter Niepold, Rodenbach; Bernhard Hämmerl, Wermelskirchen, all of Germany

[73] Assignee: Ortlinghaus-Werke GmbH, Wermelskirchen, Germany

[21] Appl. No.: 833,025

[22] Filed: Apr. 4, 1997

[30] Foreign Application Priority Data

Apr. 6, 1996 [DE] Germany .................. 196 13 763.2

[51] Int. Cl.⁶ .................................................. F16D 13/14
[52] U.S. Cl. ...................... 192/76; 192/79; 192/84.8; 192/85 AT; 188/74; 188/78; 188/170; 188/171
[58] Field of Search ..................... 192/40, 65, 76, 192/79, 84.8, 85 AT, 90, 91 A, 99 B, 107 T; 188/74, 78, 151 R, 163, 164, 170, 171, 250 A

[56] References Cited

U.S. PATENT DOCUMENTS

| | | | |
|---|---|---|---|
| 2,286,532 | 6/1942 | Freer | 192/76 X |
| 3,233,710 | 2/1966 | Daniels | 192/65 X |
| 3,304,000 | 2/1967 | Mobius | 192/76 X |
| 3,789,965 | 2/1974 | Heidorn | 192/85 AT |
| 4,679,745 | 7/1987 | Kim | 192/84.8 X |

*Primary Examiner*—Richard M. Lorence
*Attorney, Agent, or Firm*—Friedrich Kueffner

[57] ABSTRACT

A shiftable device which acts as a brake or coupling, such as a frictional brake or a frictional clutch, includes a first component and a second component and a pressure ring arranged between the first and second components, wherein the pressure ring is connected non-rotatably or stationary to the first component, while being movable by an actuating and restoring device between two work positions which are axially offset relative to each other. At least one friction element which is compressed in an active position of the pressure ring is arranged between the pressure ring and the second component. A plurality of radially resilient tongues which each have a fixed tongue end are fastened without play in the area of the first component. A plurality of guide members supported on the pressure ring and connected to the other movable tongue ends serve to convert the axial movement of the pressure ring into a radial movement of the movable tongue ends. Each guide member has two ends which are offset relative to each other axially as well as radially. A cylindrical drum is provided on the second component, wherein the cylindrical drum axially overlaps the movable tongue ends, wherein the friction element is arranged in the radial space between the cylindrical surface of the drum and the free tongue ends.

22 Claims, 10 Drawing Sheets

SHIFTABLE DEVICE ACTING AS A BRAKE OR CLUTCH, SUCH AS A FRICTIONAL BRAKE OR A FRICTIONAL CLUTCH

BACKGROUND OF THE INVENTION

1. Field of the Invention

The present invention relates to a shiftable device which acts as a brake or coupling, such as a frictional brake or a frictional clutch. The device includes a first component, such as the stator of a brake or the first half of a clutch and a second component, such as the rotor of a brake or the second half of a clutch. A pressure ring is arranged between the first and second components, wherein the pressure ring is connected nonrotatably or stationary to the first component, while being movable by means of an actuating and restoring means, such as springs, an electric magnet and/or pressure means, between two work positions which are axially offset relative to each other. The first work position constitutes a first position of operation (active position), such as the engaged position of a brake, and a second position of operation (non-active position), such as a released position of the brake. At least one friction element which is compressed in the active position of the pressure ring is arranged between the pressure ring and the second component.

2. Description of the Related Art

Devices of the above-described type are used in servomotors as frictional brakes which are required to precisely control drives in accordance with a certain movement pattern. The brake not only has to be effectively actuated at a certain time; rather, the brake must hold in its active position the rotor relative to the stator of the brake without play. When the brake is engaged, no further rotation may occur after standstill has been reached.

In known devices of this type, the requirements mentioned above can only be achieved through very expensive means. In a known device, constructed as an electromagnetically releasable spring pressure brake, the first component is a stator with integrated coil fixed to the machine frame, wherein an armature disk acting as pressure ring is attached through a diaphragm in an axially movable manner. The armature disk is under the influence of compression springs which have the tendency to press the armature disk against an axial friction element which is mounted on a brake disk arranged axially in front of the armature disk. The brake disk constitutes the second component which acts as a rotor and is connected to a shaft to be decelerated. By switching on the coil current, the armature disk is released electromagnetically from the friction element of the brake disk against the spring force acting on the armature disk, so that the released position of the brake is reached. The electromagnetic control only permits small axial movements of the armature disk between the active position and the released position thereof. Consequently, seen in the released position, the minimum air gap between the brake disk supporting the friction element, on the one hand, and the armature disk, on the other hand, must be adjusted very precisely. This requires a very complicated manufacture and time-consuming assembly of the structural components within very narrow tolerances. When wear occurs after longer periods of operation, complicated readjustments are required. The axial frictional engagement between the armature disk and the brake disk is determined exclusively by the spring force which, in the case of high braking torques, requires appropriately substantial spring elements. In the active position of operation of the brake, the braking torque is applied to the armature disk and must be transmitted axially to the stator of the brake through the diaphragm or the like supporting the armature disk.

SUMMARY OF THE INVENTION

Therefore, it is the primary object of the present invention to provide an inexpensive, compact device of the above-described type which can be assembled easily and which provides in its active position of operation a particularly effective frictional engagement.

In accordance with the present invention, the device includes a plurality of radially resilient tongues or spring tongues which each have a fixed tongue end fastened without play in the area of the first component. A plurality of guide members supported on the pressure ring and connected to the other movable tongue ends serve to convert the axial movement of the pressure ring into a radial movement of the movable tongue ends. Each guide member has two ends which are offset relative to each other axially as well as radially. Finally, a cylindrical drum is provided on the second component, wherein the cylindrical drum axially overlaps the movable tongue ends, wherein the friction element is arranged in the radial space between the cylindrical surface of the drum and the free tongue ends.

Thus, in the device according to the present invention, no torque is applied to the pressure ring. This is because, in the active position of operation of the pressure ring, torques are transmitted directly from the drum of the second component to the spring tongues connected to the first component. These spring tongues are fastened without play in the area of the first component, and, therefore, ensure in the active position of operation a fixed connection between the two components which interact either in the manner of a brake or in the manner of a clutch. This fastening without play can be achieved in a simple manner by mounting the fixed ends of the spring tongues immediately on the first component. Alternatively, these fixed tongue ends can also be fastened to an adjacent structural machine part, so that the tongue ends are connected without play indirectly relative to the first component. Particularly emphasized must be the radial frictional engagement in the active position of operation of the device which occurs at the oppositely located loose tongue ends.

Although the pressure ring is exclusively movable in axial direction by the actuating and restoring means, a radial frictional engagement is effected. This radial engagement is ensured by the guide members which produce from the axial movement of the pressure disk a radial movement of the loose tongue ends. As compared to the position existing in the released state, in, the active position of operation the loose tongue ends are either radially spread apart from each other or are radially pressed together. In the active position of operation, a friction element or several friction elements are effectively actuated, wherein the friction elements are arranged in the radial space between the loose tongue ends, on the one hand, and, on the other hand, the cylindrical surface of a drum which is fixedly connected to the second component. Because of the radial position of the friction elements in the device, an axial adjustment of the device is not required, as had been necessary in the prior art. In addition, a significant force amplification occurs; this is because a relatively small force of actuation results in a very high contact pressure force of the friction elements. This force amplification depends on the extent by which the two ends of the guide members are offset radially and axially. As mentioned above, the guide members are with their ends offset relative to each other axially as well as radially. This results in an angular position of the guide members, so that a substantially higher radial force component acts on the spring tongues resulting in this force amplification.

Each structural group formed by a spring tongue and the corresponding guide member may be constructed as a single piece or as two pieces.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
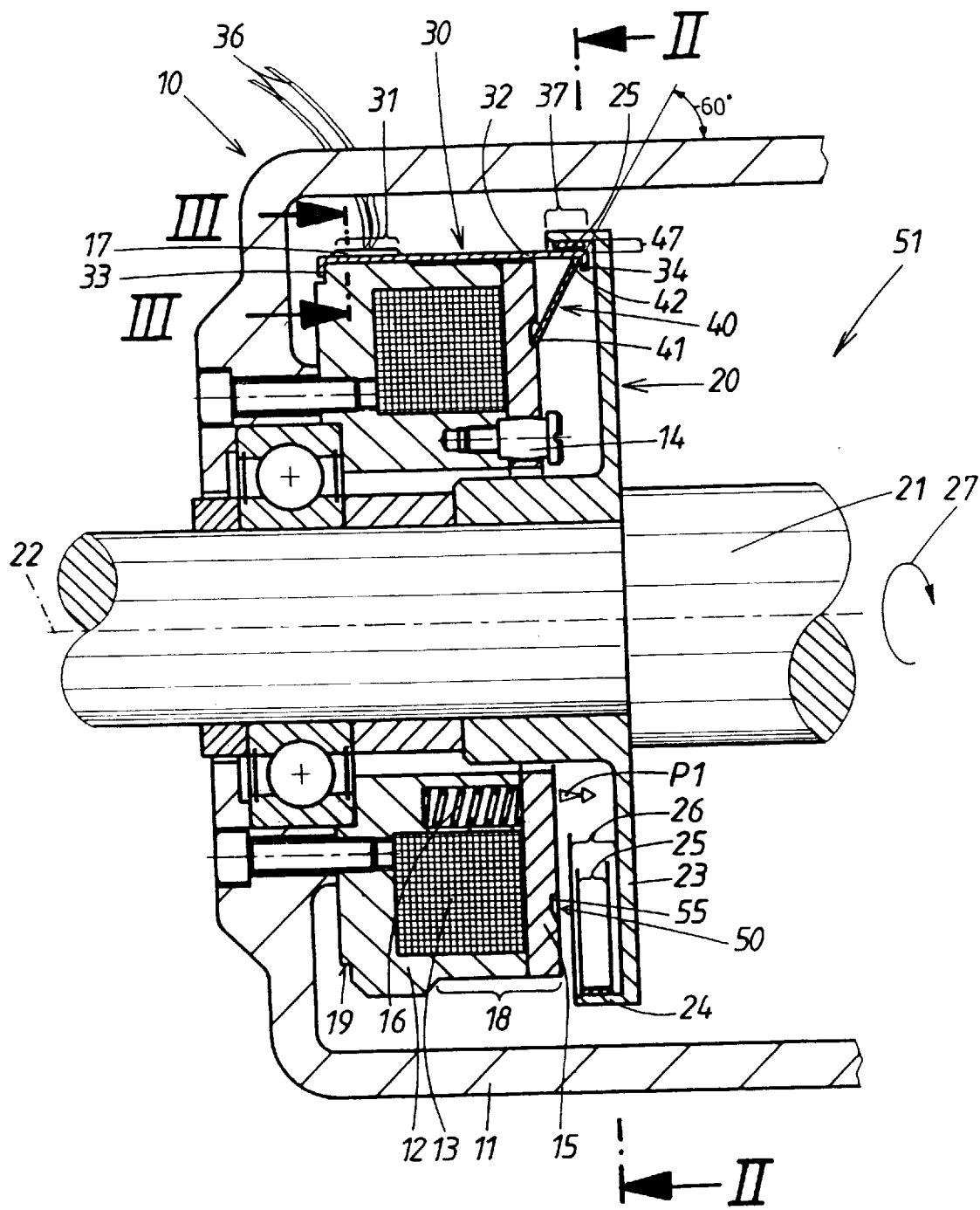
FIG. 1 is a schematic axial sectional view of a first embodiment of the device according to the present invention constructed as a spring pressure brake to be released electromagnetically.

The first embodiment of the device according to the present invention shown in FIGS. 1 to 5 is a frictional brake 51 which is constructed as a spring pressure brake to be opened electromagnetically. This brake 51 includes a first stationary component 10 which includes a magnetic body 12 arranged in a housing 11, for example, an motor endshield, wherein a coil is integrated in the magnetic body 12. This component 10 constitutes the "stator" of this frictional brake 51. A pressure ring 15 is connected to the stator 10 so as to be radially fixed relative to the stator 10, but axially movable relative to the stator 10. For this purpose, guide bolts 14 are arranged in the magnetic body 12, wherein the guide bolts 14 extend through axial bores in the pressure ring 15. The pressure ring 15 is of a magnetizable material and, when current flows in the coil 13, interacts as an armature disk with the magnetic body 12. The pressure ring 15 is under the influence of compression springs 16, which have the tendency of pressing the pressure ring 15 away from the magnetic body 12 in the direction of extension of the shaft axis 22. In the illustrated embodiment, several pressure springs 16 are provided which are placed in axial bores of the magnetic body 12 and exert an axial force indicated by arrow P1.

The other component of the brake 51 is the rotor 20 which is connected in a fixed manner to the shaft 21 to be decelerated during operation. The rotation of the shaft 21 is indicated by an arrow 27 in FIG. 1. However, the rotor 20 not only includes a disk 23 fixedly connected to the shaft, but also a cylindrical drum 24 mounted on the disk 23. In this illustrated embodiment, the drum 24 supports on its cylindrical inner surface a friction element 25 which in this case is a friction lining mounted on the cylinder surface 26.

Figure 3:
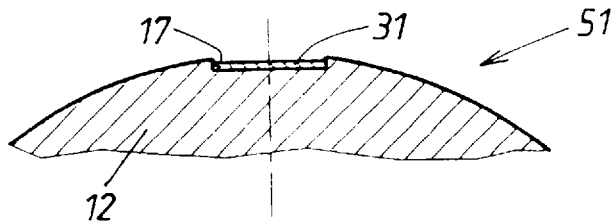
FIG. 3 is a partial sectional view, on a larger scale, of a detail of the device shown in FIG. 1, taken along sectional line III—III of FIG. 1.

A first special feature of the present invention is the fact that elastic bodies are mounted in the area of the stator 10, wherein the elastic bodies in the illustrated case are radially resilient tongues 30, which in the following will be referred to as spring tongues. In this case, the spring tongues themselves are of an elastic material, such as steel, which produces a radial spring force as a result of its material. However, it would also be possible to provide additional springs which cause the otherwise inelastic tongues to be resilient. In the present case, the spring tongues 30 are anchored with a fixed first tongue end 31 directly to the magnetic body 12 of the stator 10. The spring tongues 30 have the shape of strips. As shown in FIG. 3, the strip ends forming the fixed tongue ends 31 are fastened in circumferential axial grooves 17 of the magnetic body 12 by deforming the axial groove after the defined length of the strips has been adjusted. The fixed end 31 of each spring tongue 30 may include a radially inwardly angled end piece 33 which engages behind a correspondingly stepped shoulder 13 of the magnetic body 12. This makes it easier to achieve a defined position of the spring tongues 30 when they are mounted on the stator 10. The adjacent portion 18 of the magnetic body 12 may have a reduced diameter and the adjacent length portion of the spring tongue 30 may more or less freely project over the portion 18.

Figure 2:
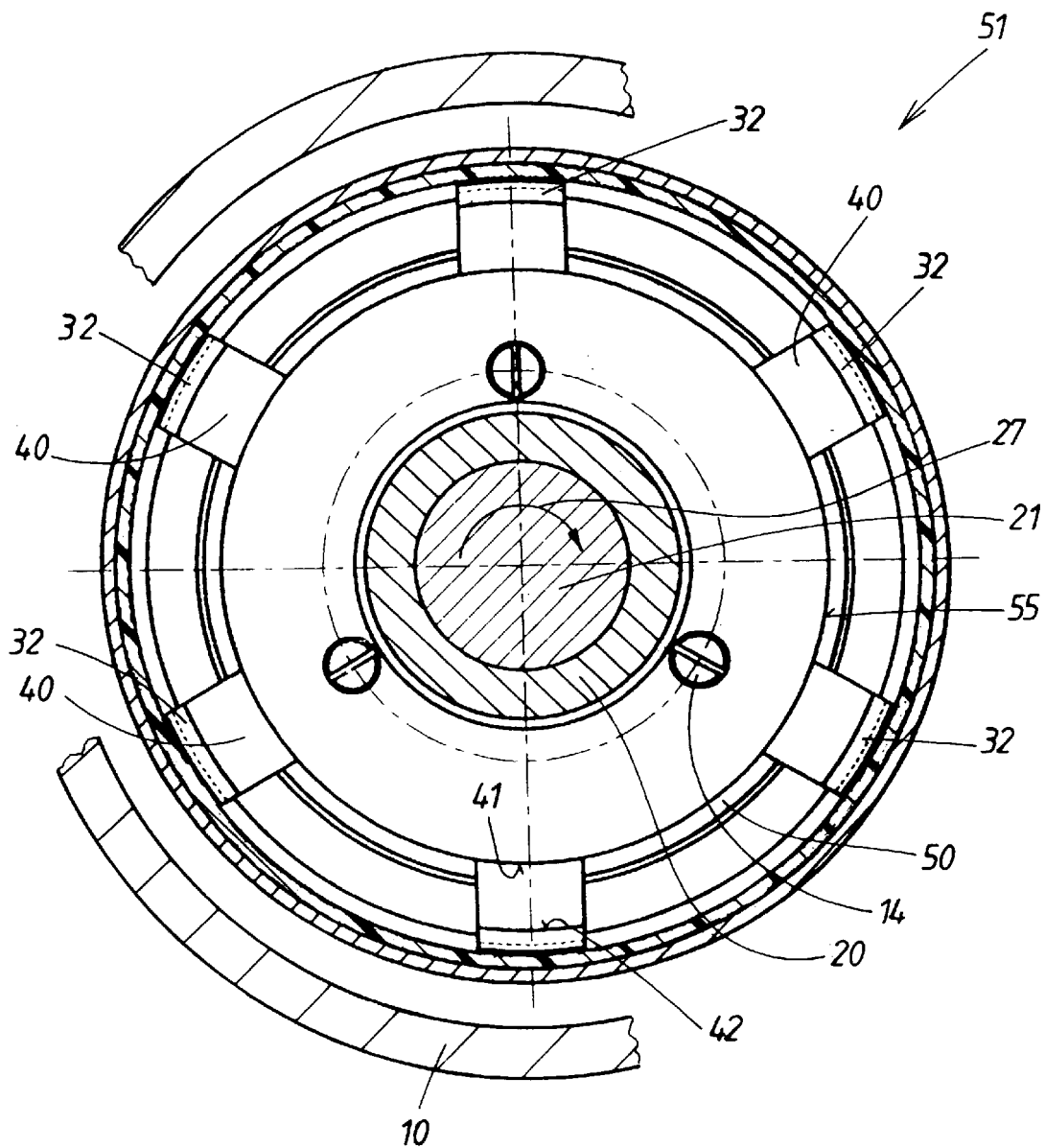
FIG. 2 is a sectional view of the device of FIG. 1 taken along sectional line II—II.

In the illustrated embodiment of the spring pressure brake 51, six such spring tongues 30 are arranged over the circumference of the magnetic body 12; however, for clarity's sake, only the uppermost spring tongue 30 is shown in a sectional view in FIG. 1, while the other five spring tongues 30 are not shown. The distribution of the spring tongues 30 can be seen in connection with FIG. 2 which shows the free tongue ends 32, wherein FIG. 2 is a front sectional view of the device taken along sectional line II—II of FIG. 1.

Figure 4A:
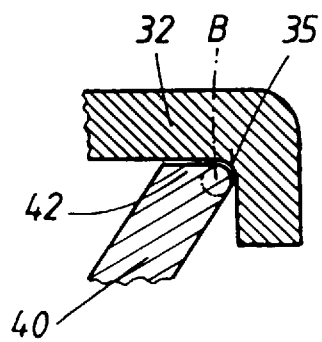
FIGS. 4a and 4b are partial sectional views, on an even larger scale, of details of the device of FIG. 1.
Figure 4B:
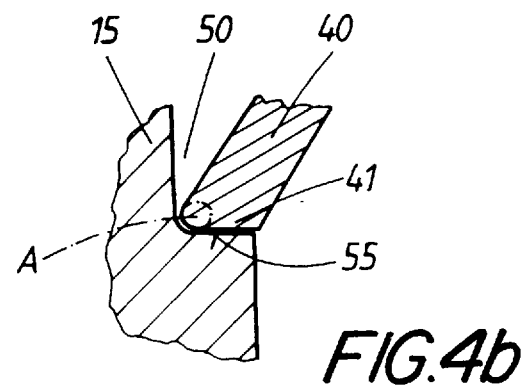

In accordance with another special feature of the present invention, essentially buckle-proof bodies are provided at the free tongue ends 32. In the illustrated embodiment, these bodies are individual plate-shaped members 40. In the following, for reasons to be explained below, these members 40 will be referred to as guide members. Each spring tongue 30 is provided with its own guide member 40. Accordingly, the spring tongues 30 and the corresponding guide members 40 each form a multicomponent pair. As illustrated in FIGS. 1 and 2, the end phase of the pressure ring 15 is provided with a coaxial annular groove 50, wherein a groove side and the groove bottom of the annular groove 50 form the support surfaces 55 for one end 41 of a guide member, as illustrated in FIG. 4b. The guide member 40 is essentially buckle-proof and the end 41 of the guide member 40 forms with the guide surfaces 55 a first pivot point A, wherein, for this purpose, the edge at the end 41 is advantageously rounded. In the following, this pivot point A will in short be called "inner pivot".

The other end 42 of the guide member 40 rests against the free tongue end 32, wherein, for this purpose, the free tongue end 32 is radially inwardly angled with an end piece 34. As can best be seen in FIG. 5, the end 42 which, as shown in FIG. 4a is also rounded at its outer edge, rests against the inside 35 of the angle. This produces between the inside 35 of the angle and the end 42 of the guide member 40 another pivot point B which in the following will in short be called "outer pivot". The two ends 41, 42 are offset relative to each other axially as well as radially, so that each guide member 40 is inclined and, in the illustrated embodiment, includes an angle of about 60° with the shaft axis 22. Accordingly, the guide members 40 extend conically relative to the shaft axis 22, wherein the ends 41 of the guide members 40 on the side of the pressure ring are located on the inside and the ends 42 facing the tongues are located on the outside.

FIG. 1 of the drawing shows the release position of the brake 51. This is the case when current is supplied to the coil 13 from supply lines 36, a magnetic field is built up and the resulting electromagnetic field pulls the pressure disk 15 toward the magnetic body 12. In that case, the pressure ring 15 assumes tits axial initial position indicated by 15 in FIG. 5. In this position, an air gap 28 exits between the free tongue end 32, on the one hand, and the friction lining 25 on the drum 24 belonging to the rotor 20, on the other hand. The tongue ends 32 overlap the drum 24 in the area indicated by 37 in FIG. 1. Consequently, the friction lining is located in a radial space 47 defined between the drum 24 and the tongue ends 32.

Figure 5:
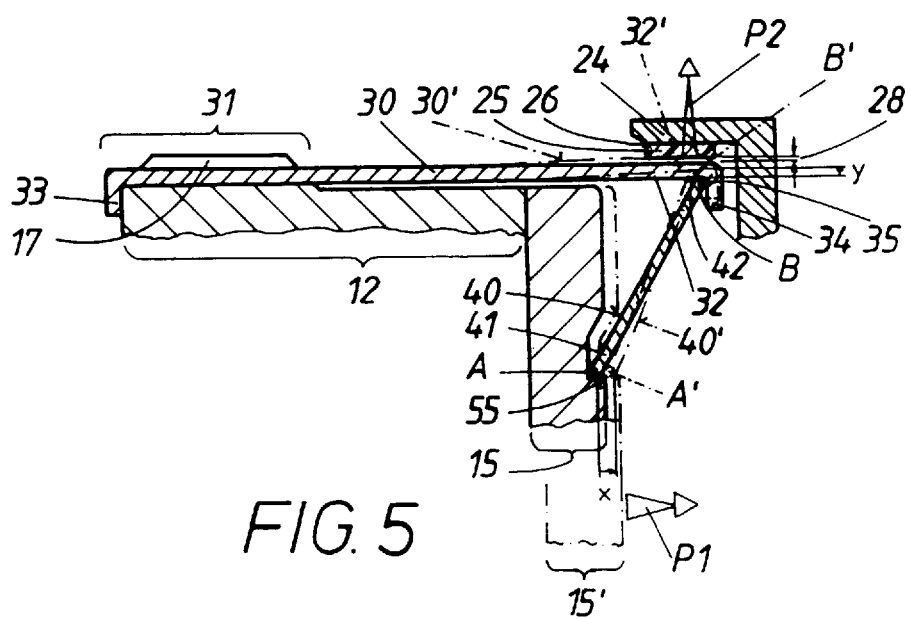
FIG. 5 is an axial sectional view corresponding to FIG. 1, on a larger scale, showing a detail of the device in two different positions of operation corresponding to the released position and the engaged position of the frictional brake.

As already mentioned, when no current is supplied to the coil 13, the pressure ring 15 is moved axially by the axial force P1 of the compression springs 16 into the other position of operation 15' shown in dash-dot lines in FIG. 5. This causes the above-described inner pivot A to be moved by the axial distance x into the position A'. However, the outer ends 42 of the guide members 40 cannot carry out this axial movement x, because an axial movement is not possible at that location because of the above-described configuration of the outer pivot B. Consequently, the guide member 40 must be transferred into a position 40' which has a steeper angle as compared to the previous position, so that the outer pivot B is essentially forced radially into the position B'. As mentioned above, the guide members 40 are essentially rigid. However, since the corresponding spring tongues 30 are elastic, the spring tongues 30 can be bent from the original essentially straight position 30 shown in FIG. 5 into the position 30' radially spread out by the radial distance y also shown in FIG. 5. This radial distance y closes the above-described air gap 28. Consequently, a frictional engagement of the free tongue ends which are in their spread-out position 32' is achieved with the lining 25 provided on the drum. The brake 51 is now in its active position of operation.

The axial force P1 produced by the compression springs 16 now generates a friction-producing radial force indicated by arrow P2 in FIG. 5. Because of the steeply inclined position of the guide members 40' in this braking position 40' of the guide members, a substantial force amplification occurs, as indicated by the two force arrows P1 and P2 in FIG. 5. This results in a particularly effective frictional engagement. The brake torque is achieved between the spring tongues 30 and the cylindrical inner surface 26 provided with the friction lining 25. The occurring brake torque is absorbed by the spring tongues 30' directly by the stator 10 through the aforementioned fixedly positioned tongue ends 31, so that no torque is applied to the pressure ring 15.

Figure 14:
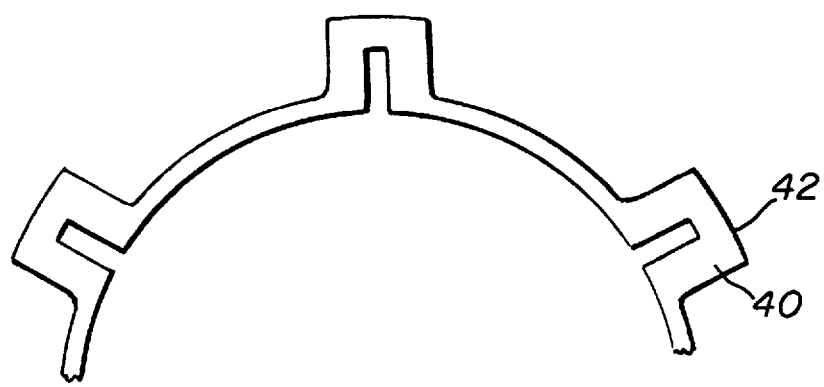
FIG. 14 is a partial view showing an elastic holder.

In the initial position 30 of the spring tongues, i.e., in the released position of the brake 51 shown in FIG. 1, the guide members 40 may already be axially and radially pretensioned. This can be achieved by a suitable dimensioning of the length of the individual guide members 40. Consequently, the assembled position of the guide members 40 is secured at their inner and outer pivots A and B. For securing the guide members 40 in their position, it is also possible to provide connections between the guide members 40. The connections may be in the form of an elastic holder, as illustrated in FIG. 14.

Figure 6:
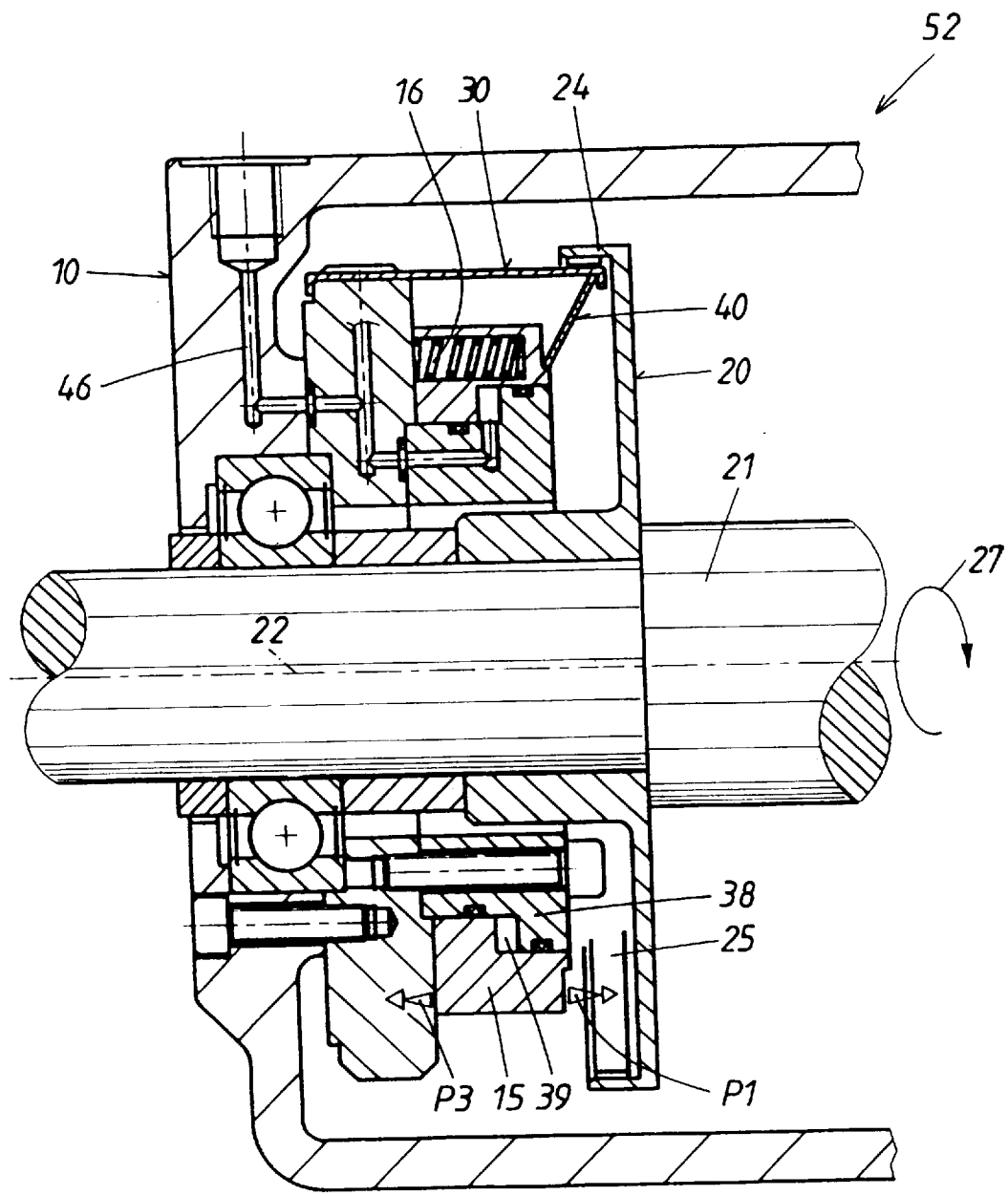
FIG. 6 is an axial sectional view of a second embodiment of the device according to the present invention, corresponding to the view of FIG. 1, wherein the device is also constructed as a spring pressure brake but can be opened by pressure means.

FIG. 6 of the drawing is a view corresponding to FIG. 1 showing an alternate embodiment of the frictional brake, i.e., again as a spring pressure brake 52 because compression springs 61 are also used for transferring the pressure ring 15 into the active position of operation. Corresponding structural components are provided with the same reference numerals as in the description of FIGS. 1 through 5; therefore, the above description is sufficient. Only the differences will be pointed out below.

A significant difference of the brake 52 shown in FIG. 6 is the fact that is it released by pressure means. In this case, the pressure ring 15 is constructed as a so-called "piston", while a so-called cylinder part 38 is provided at the stator 10. In this case, the compression springs 16 are integrated in axial recesses of the pressure ring 15 acting as the piston part. A pressure medium space 39 is created between the piston part 15 and the cylinder part 38. Pressure medium is supplied to the space 39 through various ducts 46 shown in FIG. 6. The pressure medium introduced into the space 39 produces a pressure medium force P3 which counteracts the compression spring force P1 and produces the released position shown in FIG. 6. In order to transfer the brake into its active position of operation, only the supply of pressure medium has to seize. The compression springs 16 can then generate the axial force P1 and the spring tongues 30 are spread out as already described in connection with FIG. 5. A frictional engagement with the friction lining 25 provided radially at the inner surface of the drum 24 occurs.

Figure 7:
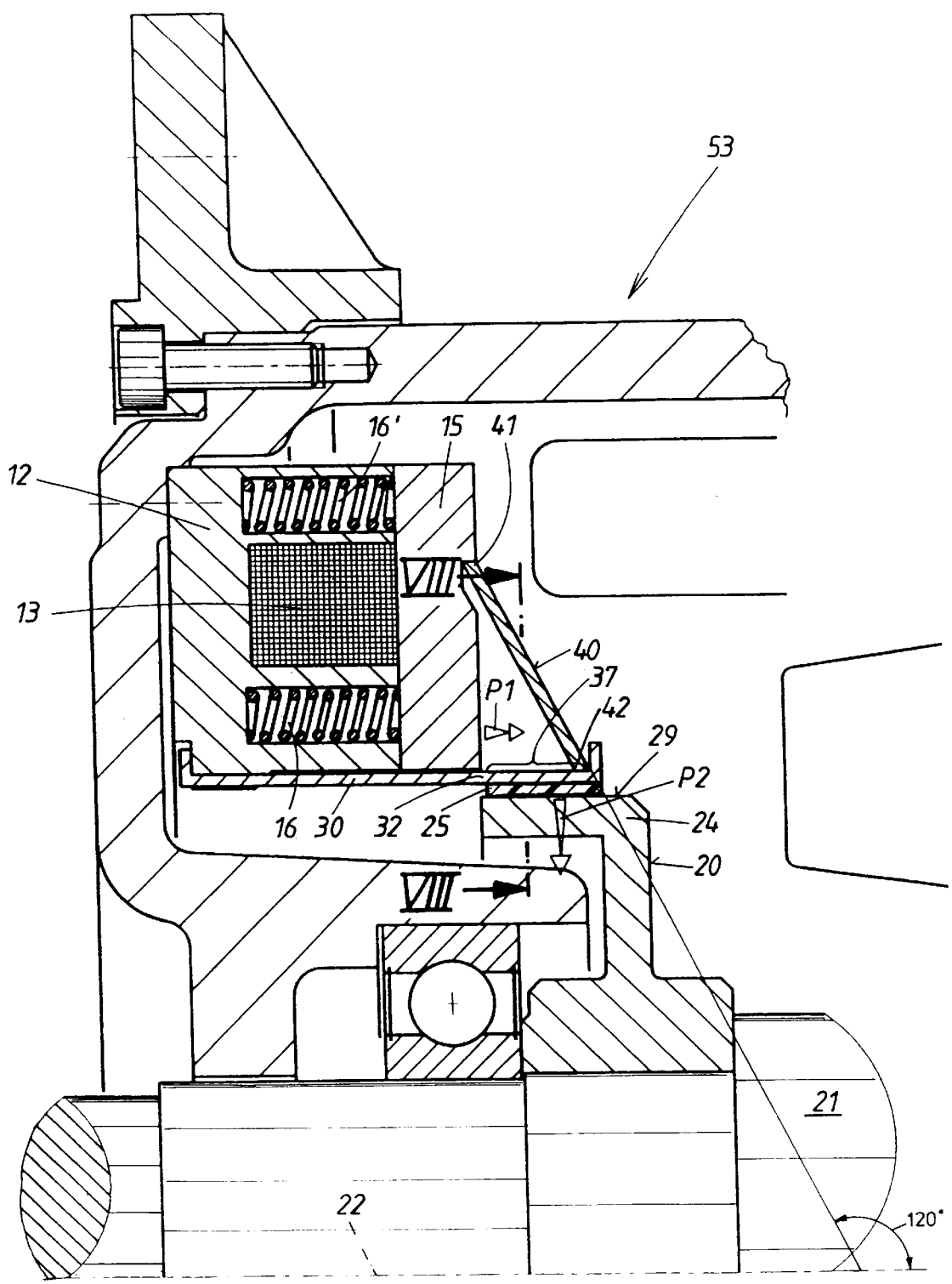
FIG. 7 is an axial sectional view of a third embodiment of the device according the present invention, again constructed as a spring pressure brake which can be opened electromagnetically, but with the rotor arranged in the interior.

The third embodiment of the present invention shown in FIG. 7 is again an electromagnetically released spring pressure brake 53 which is constructed and operates essentially as already described in connection with the spring pressure brake 51 shown in FIGS. 1 to 5. In this case it is also sufficient to merely describe the differences as compared to the embodiments described above. For this reason, essentially the same reference numerals have been used as above, so that the description provided above is again applicable.

The essential difference resides in the fact that the axially movable pressure ring 15 and the corresponding magnetic body with the coil 13 are arranged at a greater radial distance from the shaft 21 than the rotor 20 provided with the cylindrical drum 24. Also, the spring tongues 30 which in principle are constructed in the same manner as in the previously described embodiments, are not arranged on the outer circumference of the ring-shaped magnetic body 12, but on the inner circumference of the magnetic body 12. Apart from the compression springs 16 mentioned above, the axial force P1 can be increased by providing an additional row of compression springs 16'. Another special feature as compared to the previous embodiments is the oppositely inclined position of the guide members 40.

This configuration is achieved because the ends 41 of the guide members 40 resting against the pressure ring 15 are arranged at a greater axial distance from the shaft axis 22 than the oppositely located other ends 42 resting on the free tongue ends 32. In this case, the ends 42 facing the tongues are located on the inside and the ends 41 facing the pressure ring are located on the outside. The guide members 40 define with the shaft axis 22 an obtuse angle of about 120°. However, the resulting manner of operation is analogous to that described in connection with FIG. 5, but in a mirror-inverted position. Also, in this brake 53, an axial force P1 used for control produces a greater frictionally effective radial force P1 which, however, is now directed radially inwardly toward the shaft axis 22.

Figure 8:
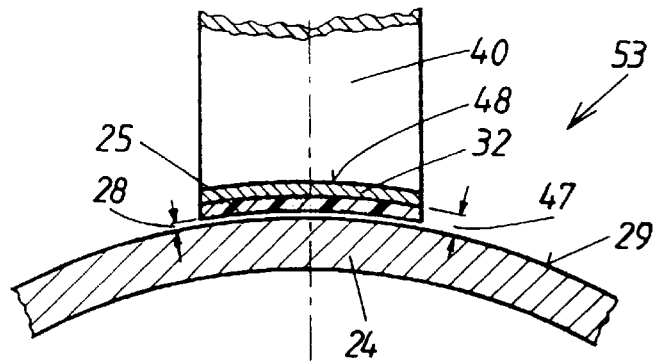
FIG. 8 is a cross-sectional view of a detail of the device shown in FIG. 7, taken along sectional line VIII—VIII of FIG. 7.

FIG. 8 illustrates in the brake 53 the conditions on a scale corresponding to the reel conditions, wherein the air gap 28 can also be seen in the released position, however, opposite the now friction-producing cylindrical outer surface 29. Also in this case, the friction element in the form of a friction lining 25 is arranged in the radial space 47 between the free tongue ends 32 and the effective cylindrical outer surface 29 of the drum 34. A difference resides in the fact that this friction lining 23 is not fastened as a circumferential ring on the cylindrical surface 29, but is a fixed component of the free tongue ends 32; in this case, the spring tongues support the friction lining 25.

However, FIG. 8 shows an additional feature which is also realized analogously in the embodiments described above.

First, it is understood that the tongues, at least in the overlapping area 37 with the rotor drum 24, have a cross-sectional profile shown in FIG. 8, which is constructed so as to conform to the effective cylindrical surface 29. Moreover, as also shown in FIG. 8, the guide members 40 have at the support edges 48 facing the tongue 32 a shape which conforms to the cylindrical profile of the free tongue ends 32. This shape of the support edge 48 ensures that a contact occurs over a surface area and, thus, results in a low surface contact pressure during operation. This is also applicable analogously in the situation shown in FIG. 2, i.e., at the two ends 41, 42 of each guide member 40.

Figure 9:
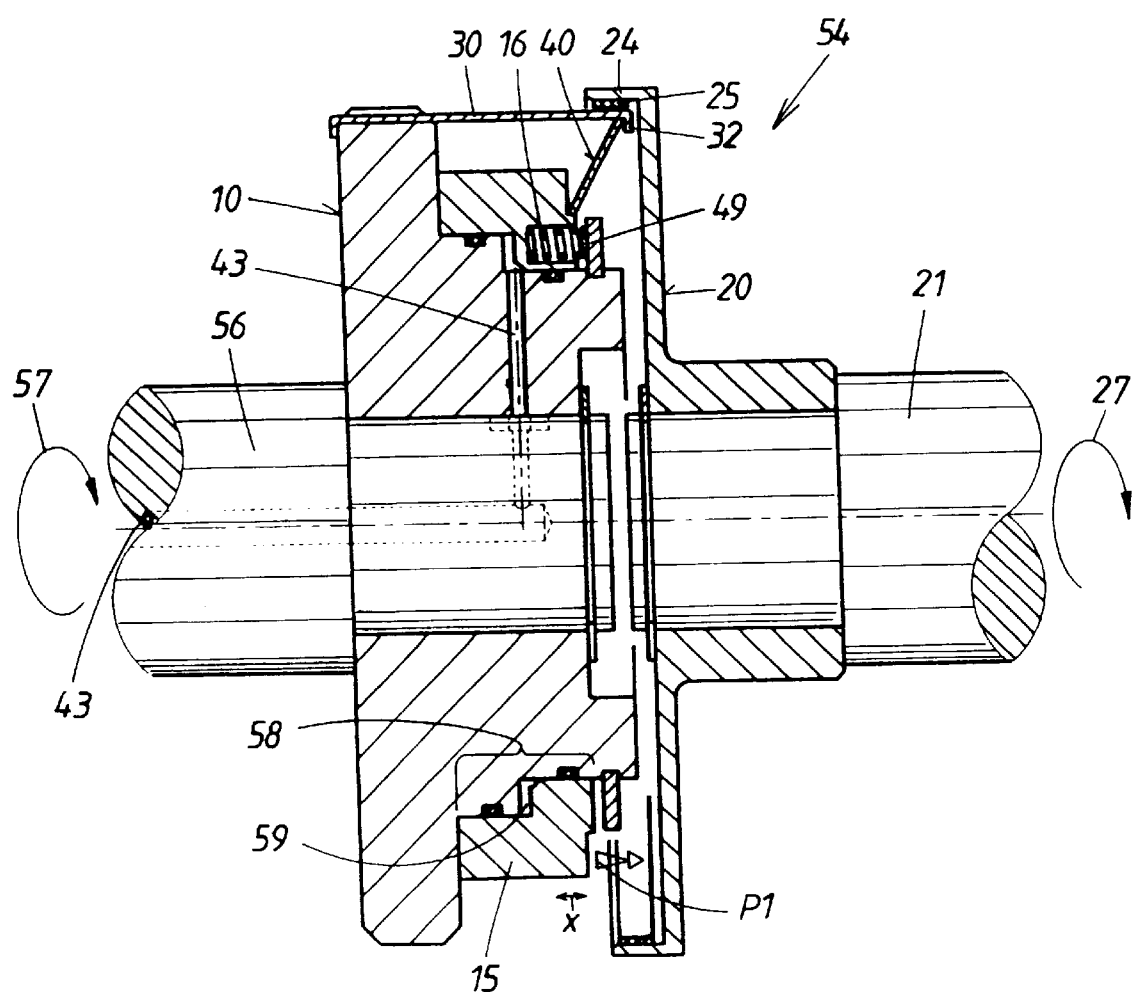
FIG. 9 is an axial sectional view of a fourth embodiment of the present invention, corresponding to the view of FIG. 1, wherein the device is constructed as a clutch which is actuated by pressure means.

FIG. 9 of the drawing shows a clutch 54 as a fourth embodiment of the device according to the present invention. Also in this case, corresponding structural components are described using the same terminology as in the embodiments described above constructed as a brake. Accordingly, the same reference numerals are used and the same description is applicable analogously. However, since the embodiment of FIG. 9 is a clutch, sometimes different terms have to be used for analogous parts.

In the active position of operation of this clutch 54, i.e., in the engaged state, a rotation 27 of the input shaft 21 is to Abe transmitted to produce a corresponding rotation 57 of an output shaft 56. Accordingly, a first component 10, i.e., the first clutch half, is fixedly connected to the output shaft 56 and a second component 20, i.e., the other clutch half, is fixedly connected to the input shaft 21. Aside from the pressure ring 15 which is provided on the clutch half 10 and is axially movable in the direction of double arrow x, the two components 10, 20 are also axially immovably attached to their shafts 21 and 56, respectively. Compression springs 16 are again provided on one component 10, wherein, however, these compression springs 16 act in a manner different from that in the preceding embodiments. The compression springs 16 have the tendency to hold the clutch 54 in its non-active position, i.e., in the disengaged position. This is because the springs 16 rest on a support ring 49 provided axially fixed to the clutch half 10 and the springs 16 are received in axial bores of the pressure ring 15 which also in this case in constructed as a pressure medium piston. Axially stepped portions of the component 10 produce a cylinder part 58 which defines a pressure medium space 59 together with the pressure ring 15.

Pressure medium is supplied through axially and radially extending ducts 43 to the pressure medium space 59 when the active clutch position is desired. The pressure medium now acts against the restoring effect of the compression springs 16 and moves the pressure ring 15 outwardly by means of an excess axial force P1. Consequently, in this case, the axial force P1 is not produced by springs, but by pressure medium. However, the conditions are otherwise analogous to the conditions described above in connection with the preceding embodiments.

Also in this case, the component 10 is provided with a plurality of essentially axially extending spring tongues 30 and a corresponding plurality of guide members 40 are supported between the free tongue ends 43 and the pressure ring 15. The second component 20 includes a drum 24 which supports the above described friction elements 25 at the cylindrical inner surface thereof. This produces the analogous results as described in connection with FIG. 5. In the active position 30' shown in FIG. 5, in which the spring tongues 30 are spread outwardly, a torque is transmitted in the clutch 54 between the shafts 21 and 56.

FIGS. 10 through 13 show a modified embodiment 70 of the spring pressure brake illustrated in FIGS. 1 to 5. It is sufficient to describe the differences, while otherwise the same description with the same reference numerals is applicable.

Figure 11:
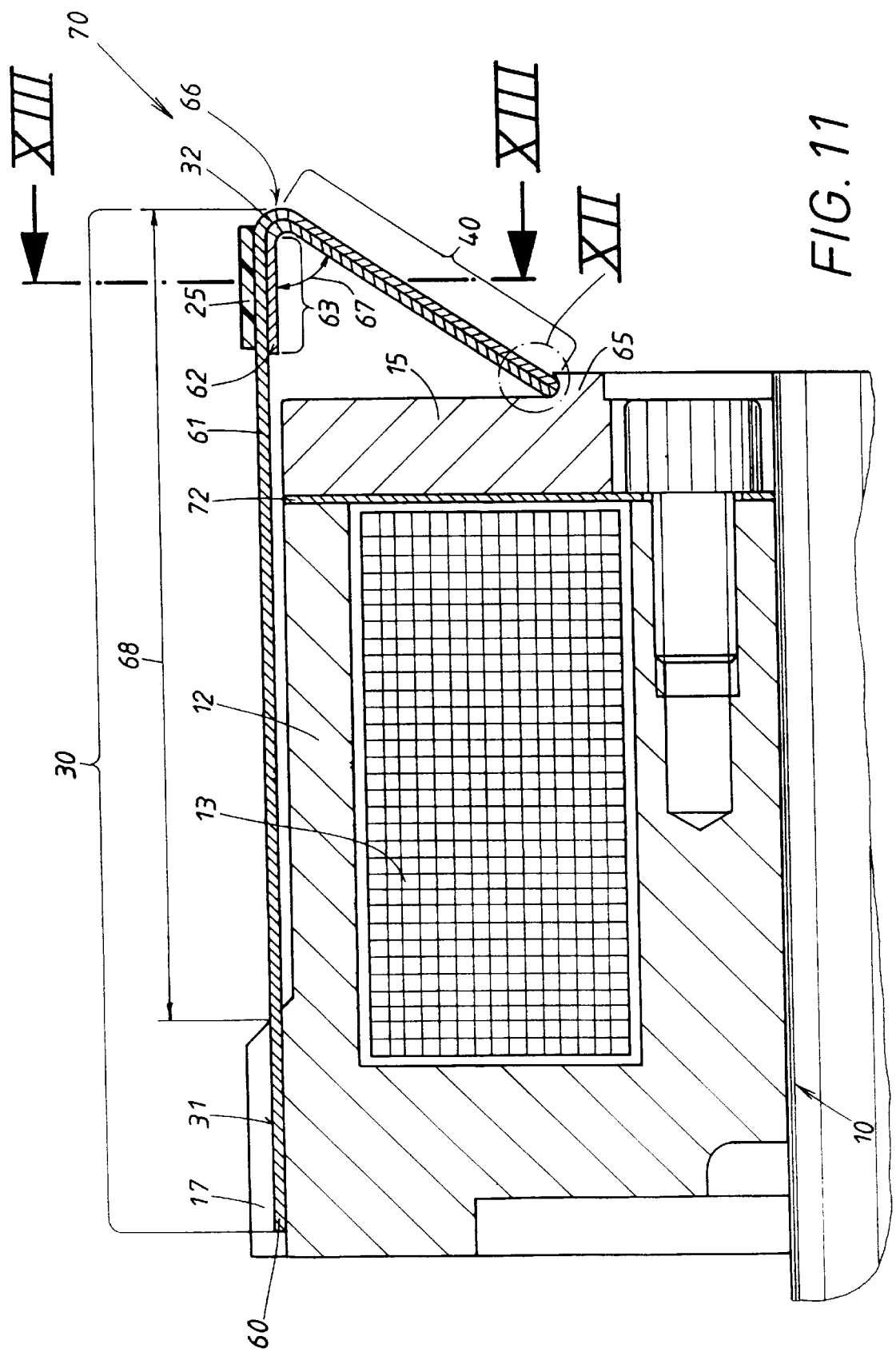
FIG. 11 is a sectional view, on a larger scale, of a detail of the device of FIG. 10.

An important difference of the spring pressure brake 70 is the fact that, as can best be seen in FIG. 11, the pair formed of spring tongue 30 and corresponding guide member 40 is constructed of a single piece. This structural group is manufactured from a strip material 60 which in this case is elastic, for example, of steel. At those locations where the product is to be elastically resilient, it is provided in a single layer 61, while several layers of the strip material are placed on top of one another in the desired stiff portions. For example, in the illustrated embodiment, the portion serving as the guide member 40 is composed of two layers 61, 62. As also shown in FIG. 11, the second layer 62 may extend with an end piece 60 into the end portion 32 of the tongue 30. Consequently, the strip material 60 is shaped into a single-piece folded and bent product 66 resulting in the pair of members 30, 40 which are mounted in the device in the following special manner.

Figure 12:
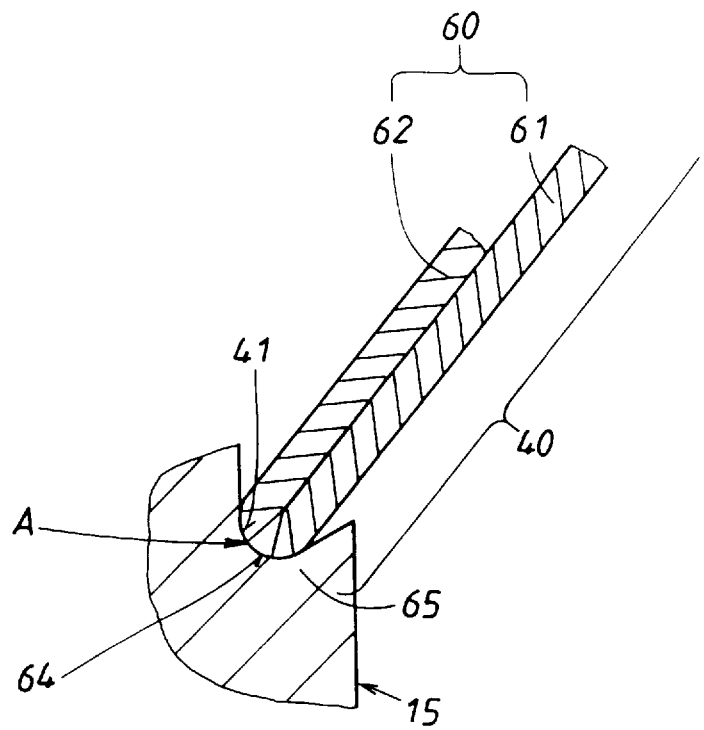
FIG. 12 is a partial sectional view, on an even larger scale, showing, similar to FIG. 4b, another detail of the device of FIGS. 10 and 11.
Figure 13:
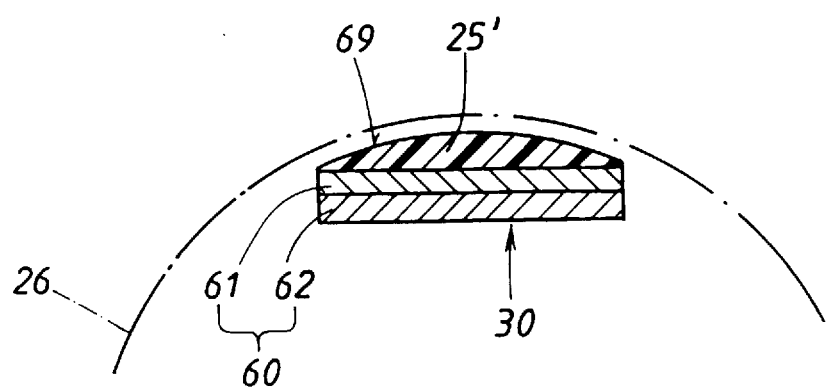
FIG. 13 is a cross-sectional view, corresponding to the view of FIG. 8, showing a detail of the device of FIG. 11, taken along sectional line XIII—XIII of FIG. 11.

The arm of the product 66 serving to form the tongue 30 is inserted with its end 31 into the already mentioned axial groove 17 and the tongue 30 is initially axially movable within the axial groove 17. As illustrated in FIG. 12, the end of the portion serving as the guide member 40 is rounded and is received in a correspondingly shaped concave groove 64 of the pressure ring 15. For forming this groove 64, the pressure ring 15 is provided with a projection 65. At this location, the inner pivot A already described in connection with the first embodiment is created. Prior to assembly, the angle 67 between the two sides 30 and 40 of the product 66 is smaller than it is in the assembled position. The side 30 of the product 66 is provided with a defined effective length 68 shown in FIG. 11. The tongue 30 projects by this length 68 out of the guide groove 17 and is radially elastically flexible in this length portion in the manner described above. This effective length 68 of the tongue is fixedly attached. This is achieved, for example, by upsetting the groove 17, so that the end 31 inserted into the groove becomes stationary. As already mentioned, in this state of assembly, the angle 67 between the two sides 30 and 40 of the product 66 becomes greater. Since the angle 67 has the tendency to become smaller, an initial spring tension exists in the assembled state. FIG. 11 shows that, in this embodiment, the spring tongue 30 supports a friction element 25'. The friction element 25' is located in that end portion in which also the partial length 63 of the second layer 62 of strip material 60 is provided. Consequently, the end piece of the spring tongue 30 is stiffened where the friction element 25' is provided. This is also illustrated in the cross-sectional view of FIG. 13.

The strip material 60 is of plane construction, while the friction element 25' mounted on the layers 61, 62 is profiled with a special cross-sectional shape. The friction element 25' has over portions thereof different lining thicknesses and provides a cylindrically arched effective friction surface 69 at its radial circumference. This arch 69 conforms to the cylindrical inner surface 26 shown in dash-dot lines in FIG. 13 of the drum 24, which can also be seen in FIG. 10. This drum 24 is fixedly attached to the shaft 21 by means of a press ring 71.

An elastic spring disk 72 whose position can best be seen in FIG. 11 is provided for mounting and guiding the pressure ring 15. The spring disk 72 is located between the pressure ring 15, on the one hand, and, on the other hand, the housing of the magnetic body 12 which includes the electromagnetic coil 13. The compression springs 16, already described in connection with the first embodiment, rest against the spring disk 72. The spring disk 72 is at certain locations attached to the pressure ring 15 by means of bolts 73. At radially offset locations, the spring disk 72 is fastened to the housing of the magnetic body 12 by means of screws 75.

Figure 10:
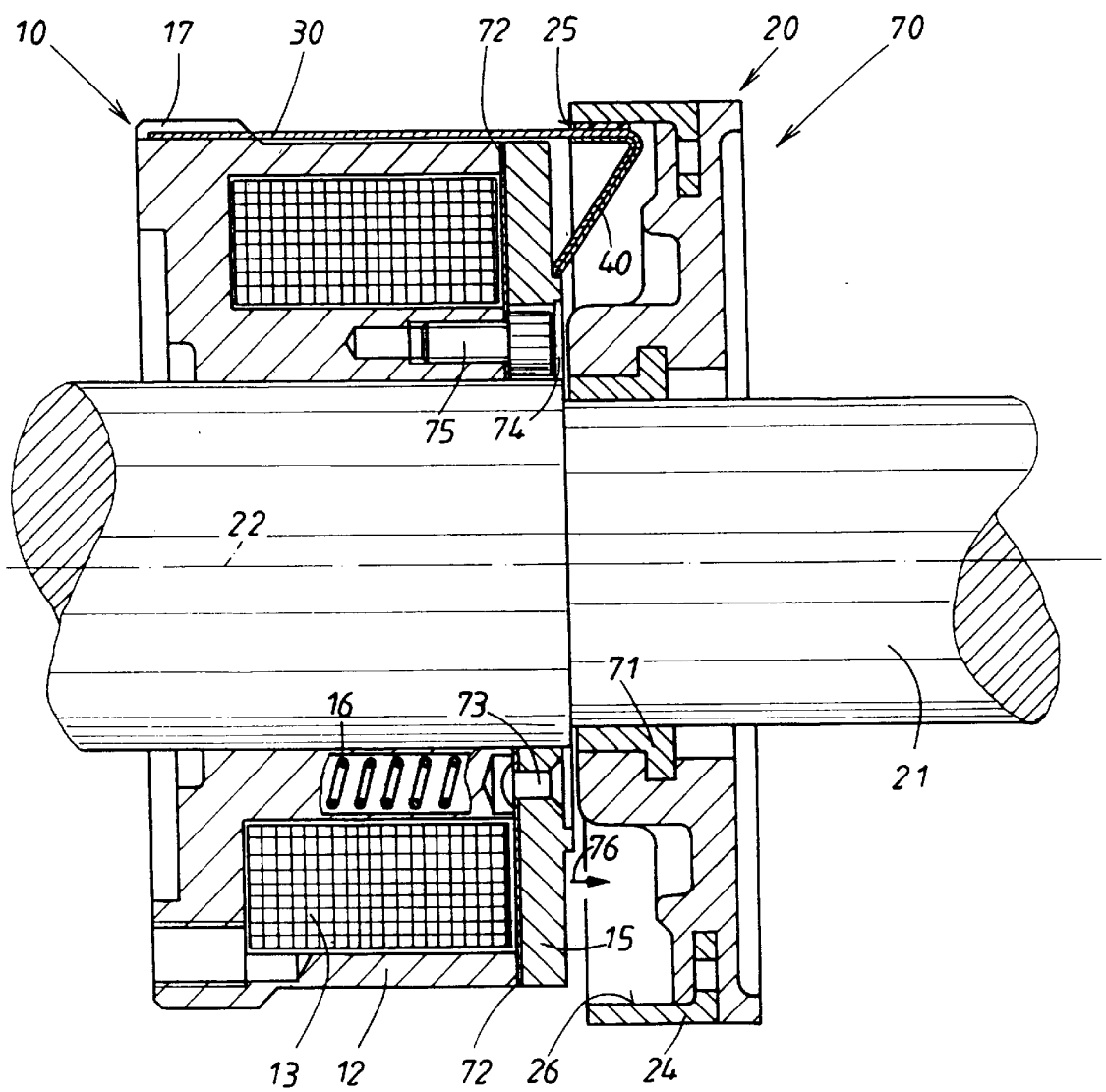
FIG. 10 is an axial sectional view of a fifth embodiment of the invention, corresponding to the view of FIG. 1, wherein each structural group formed by a spring tongue and a guide member is constructed as a single piece.

The pressure ring 15 is axially movable in the device by means of the spring disk 72 in the direction of arrow 76 shown in FIG. 10. This axial movement 76 is produced by switching on and off the electric magnet, as described already in connection with the first embodiment.

While specific embodiments of the invention have been shown and described in detail to illustrate the inventive principles, it will be understood that the invention may be embodied otherwise without departing from such principles.

We claim:

1. A shiftable device comprising a first component and a second component each having an axis, and a pressure ring arranged between the first component and the second component, wherein the pressure ring is attached to the first component, further comprising actuating and restoring means for moving the pressure ring between a first work position and a second work position wherein the first work position and a second work position are axially offset relative to each other, the first work position being a first active position of operation and the second work position being a non-active position of operation, at least one friction element which is compressed in the first active position of operation being arranged between the pressure ring and the second component, the device further comprising a plurality of radially resilient spring tongues, each spring tongue having a fixed tongue end fastened without play to the first component and a free movable tongue end, a plurality of guide members being supported on the pressure ring and connected to the movable tongue ends for converting an axial movement of the pressure ring into a radial movement of the movable tongue ends, each guide member having two ends located offset relative to each other axially as well as radially, a cylindrical drum having a cylindrical surface being mounted on the second component, wherein the cylindrical drum axially overlaps the movable tongue ends, and wherein the friction element is arranged in a radial space between the cylindrical surface of the drum and the free moveable tongue ends.

2. The device according to claim 1, wherein the device is a frictional brake, wherein the first component is a stator and the second component is a rotor of the brake, and wherein the first active position of operation is an engaged position of the brake and the second non-active position of operation is a release position of the brake.

3. The device according to claim 1, wherein the device is a frictional clutch, and wherein the first component is a first half of the clutch and the second component is a second half of the clutch.

4. The device according to claim 1, wherein the actuating and restoring means comprises at least one of springs, an electric magnet and pressure means.

5. The device according to claim 1, wherein the guide members are supported on the pressure ring in a pivot point each.

6. The device according to claim 1, wherein the guide members and the spring tongues are separately manufactured parts, and wherein each guide member contacts a corresponding free movable tongue end in another pivot point.

7. The device according to claim 1, wherein each spring tongue and a corresponding guide member are constructed integrally as one guide piece.

8. The device according to claim 7, wherein a pair of corresponding guide member and spring tongue are comprised of a folded and bent product of strip material, wherein the strip material has multiple layers at least over portions thereof.

9. The device according to claim 1, wherein the tongues have a cross-sectional profile conforming to the cylindrical surface at least in an overlapping range of the tongues with the drum.

10. The device according to claim 1, wherein the spring tongues are configured to support the friction element.

11. The device according to claim 10, wherein the tongues are of a plane strip material, and wherein the friction element supported by the tongues is profiled and has an arched effective friction surface.

12. The device according to claim 1, comprising connecting means for connecting the guide members.

13. The device according to claim 12, wherein the connecting means comprises a holder for positioning the guide members relative to each other.

14. The device according to claim 12, wherein the connecting means for connecting the guide members is elastic.

15. The device according to claim 1, wherein the guide members comprise at ends facing the tongues a support edge each, the support edges being constructed so as to conform to the profile of the free tongue ends.

16. The device according to claim 1, wherein each spring tongue and a corresponding guide member form a pair mounted in the device so as to be axially and radially pretensioned.

17. The device according to claim 16, wherein each spring tongue is integrally connected to a corresponding guide member, and wherein the spring tongue and the guide member define an angle therebetween, wherein the angle is smaller when the guide member and tongue are mounted in the device than prior to being mounted in the device.

18. The device according to claim 6, wherein each free tongue end is radially inwardly angled and a corresponding guide member rests with an outer end thereof in an inner portion of the angle.

19. The device according to claim 1, wherein each spring tongue has an end initially mounted longitudinally adjustably in a support of the first component so as to permit adjustment of a defined effective length of the spring tongue, while the end of the spring tongue is attached stationary in the support of the first component after longitudinal adjustment of the spring tongue.

20. The device according to claim 19, wherein the attached end of the spring tongue is radially inwardly angled and the angled portion one of engages directly behind the first component and indirectly acts on an adjacent component.

21. The device according to claim 1, comprising a flexible spring disk for axially movably guiding the pressure ring in the first component, wherein the spring disk is fastened at first locations to the first component and is fastened at locations offset relative to the first locations to the pressure ring.

22. The device according to claim 21, wherein the first component is a stator of an electric magnet, and wherein the spring disk is arranged between the pressure ring and a housing of the electric magnet.

* * * * *